(12) United States Patent
Takei

(10) Patent No.: US 6,580,822 B1
(45) Date of Patent: Jun. 17, 2003

(54) DEVICE, METHOD AND RECORD MEDIUM FOR COLOR SPACE CONVERSION FROM RGB DATA TO CMYK DATA

(75) Inventor: Kenichi Takei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/447,163

(22) Filed: Nov. 22, 1999

(30) Foreign Application Priority Data

Nov. 24, 1998 (JP) .......................................... 10-333119

(51) Int. Cl.⁷ .............................. G06K 9/00; G06K 9/36
(52) U.S. Cl. ...................... 382/162; 382/167; 382/165; 382/276; 345/600; 345/603; 345/604
(58) Field of Search ................................. 382/162, 164, 382/163, 165, 167, 276; 358/515, 504, 518, 540, 501, 451, 523; 345/590, 601, 600, 602, 604, 603

(56) References Cited

U.S. PATENT DOCUMENTS

| | | | | |
|---|---|---|---|---|
| 5,504,821 A | * | 4/1996 | Kanamori et al. | 382/167 |
| 5,515,172 A | * | 5/1996 | Shiau | 358/298 |
| 5,539,540 A | * | 7/1996 | Spaulding et al. | 358/518 |
| 5,809,181 A | * | 9/1998 | Metcalfe | 382/276 |
| 5,900,952 A | * | 5/1999 | Fan | 358/518 |
| 6,064,761 A | * | 5/2000 | Metcalfe | 382/163 |
| 6,128,407 A | * | 10/2000 | Inoue et al. | 382/167 |
| 6,225,974 B1 | * | 5/2001 | Marsden et al. | 345/150 |
| 6,340,975 B2 | * | 1/2002 | Marsden et al. | 345/590 |

FOREIGN PATENT DOCUMENTS

| | | |
|---|---|---|
| JP | 63-42576 | 2/1988 |
| JP | 63-46069 | 2/1988 |
| JP | 63-100895 | 5/1988 |
| JP | 1-275141 | 11/1989 |
| JP | 2-118680 | 5/1990 |
| JP | 2-178656 | 7/1990 |
| JP | 4-369970 | 12/1992 |
| JP | 8-9176 | 1/1996 |
| JP | 2728208 | 12/1997 |
| JP | 10-136218 | 5/1998 |

* cited by examiner

Primary Examiner—Phuoc Tran
Assistant Examiner—Amir Alavi
(74) Attorney, Agent, or Firm—Dickstein, Shapiro, Morin & Oshinsky, LLP.

(57) ABSTRACT

A color space conversion device for executing color space conversion from RGB data to CMYK data comprises a color space conversion circuit, a CMY position detection circuit, three UCR/BG tables, a continuation table and a UCR/BG synthesizer circuit. The color space conversion circuit converts RGB data into C'M'Y' data. The CMY position detection circuit 2 detects the position of the C'M'Y' data in the CMY color space with respect to each dot of the C'M'Y' data. Each of the three UCR/BG tables has been optimized at particular position (in the achromatic color area, an intermediate area, and the high chroma area) in the CMY color space so as to be used for color space conversion from C'M'Y' data to CMYK data. The continuation table outputs continuation parameters based on the position of the C'M'Y' data. The UCR/BG synthesizer circuit synthesizes a suitable UCR/BG table for each dot of the C'M'Y' data from the conversion tables based on the continuation parameters, and thereafter converts the C'M'Y' data into CMYK data by use of the suitable conversion table. By the table synthesis for each dot of the C'M'Y' data using the continuation table, appropriate setting of the UCR/BG and correct color space conversion can be executed with respect to each dot, eliminating color discontinuity due to change of the UCR/BG which is used for color space conversion.

24 Claims, 4 Drawing Sheets

DEVICE, METHOD AND RECORD MEDIUM FOR COLOR SPACE CONVERSION FROM RGB DATA TO CMYK DATA

BACKGROUND OF THE INVENTION

The present invention relates to a color space conversion device and a color space conversion method for converting RGB data of a color image into CMYK data, by which high quality color printing is realized.

Description of the Prior Art

These days, a wide variety of color printers are used as color image output devices for printing color images on paper. When such a color image output device outputs a color image, parameters called UCR (Under Color Removal) and BG (Black Generation) are set to appropriate or particular values, and the UCR/BG are used for outputting the color image.

For example, in an "Image processing method" disclosed in Japanese Patent Application Laid-Open No.HEI2-9273 (Japanese Patent No.2728208), a line of RGB data is scanned in the horizontal scanning direction, and differential signals R(x)–G(x) and G(x))–B(x) (R(x): red signal, G(x): green signal, B(x): blue signal) are integrated on the line, and thereby an appropriate UCR (UCR characteristic line) for the line is determined depending on the two integrals.

In a "Printing device" disclosed in Japanese Patent Application Laid-Open No.SHO63-100895, when color space conversion is executed for achromatic color areas, the UCR/BG is corrected by use of a gamma table.

Generally, a color image input device such as a scanner, a digital camera, etc. handles and manages color images employing the RGB color space, while a color image output device such as a color printer manages color images employing the CMYK color space in many cases. A monitor (which operates as a color image input device when a color image displayed on the monitor is directly printed by a color printer) also manages color images employing the RGB color space. Therefore, color space conversion from RGB data into CMYK data becomes necessary when a color image inputted by a color image input device is outputted by a color image output device. The color space conversion from RGB data into CMYK data can be executed directly using a table called LUT (Logical Unit Table). However, in many cases, the color space conversion from RGB data into CMYK data is conducted by two steps: a first color space conversion from the RGB data into CMY data, and a second color space conversion from the CMY data into the CMYK data. The first color space conversion from RGB data into CMY data is usually executed by means of complementary color conversion, conversion using a color space conversion table, etc. The second color space conversion from CMY data into CMYK data is usually executed using the UCR/BG. The UCR/BG is usually defined as a value or a table, independently of the position of the CMY data in the CMY color space (independently of the position of the RGB data in the RGB color space).

However, in many cases, the optimum values of the UCR/BG change depending on the position of the CMY data in the CMY color space (depending on the position of the RGB data in the RGB color space). Concretely, when the CMY data is like an achromatic color (when the RGB data is like an achromatic color), it is desirable that most of the CMY data is replaced by "K" (black print), that is, the UCR/BG should be near 100%. On the other hand, when the chroma of the CMY data is high (when the chroma of the RGB data is high), it is desirable that the replacement by the "K" is reduced, that is, the UCR/BG should be smaller.

Therefore, when UCR/BG which have been optimized near the achromatic color area are employed, the "K"-print is used a lot with respect to CMY data in the achromatic color area, and thereby printed output like pure gray is obtained successfully with respect to the CMY data in the achromatic color area. However, with respect to CMY data far from the achromatic color area, the chroma of the CMY data is lowered undesirably due to the heavy use of the "K"-print. On the other hand, when UCR/BG which have been optimized near the achromatic color area are employed, the replacement by the "K"-print is limited with respect to CMY data having high chroma, and thereby printed output having high chroma is obtained successfully with respect to the CMY data having high chroma. However, with respect to CMY data in the achromatic color area, gray is necessitated to be expressed by the combination of C, M and Y since the replacement by the "K"-print is limited, and thus printed output like pure gray can not be obtained successfully.

In the conventional image processing method disclosed in Japanese Patent Application Laid-Open No.HEI2-9273, a plurality of UCRs are prepared, and an appropriate UCR to be used is selected from the UCRs based on the characteristics (the two line integrals) of the RGB data. However, the detection of the characteristics of the RGB data and the determination (selection) of the appropriate UCR based on the characteristics are executed with respect each line in the horizontal scanning direction. Therefore, even when the characteristics of the RGB data changed rapidly on the line (when achromatic areas and high chroma areas appeared alternately on the line, for example), the characteristics are integrated on the line and only one appropriate UCR is determined for the line based on the integrals. Therefore, the detection of the characteristics of the RGB data and the determination of the appropriate UCR can not be executed correctly by the conventional image processing method. Further, when the selection of an appropriate UCR from the prepared UCRs is executed with respect to each line, the selected UCR changes between lines, and thus color discontinuity occurs between the lines in the printed color image. However, no countermeasures for correcting the color discontinuity have been disclosed in the document.

The conventional printing device disclosed in Japanese Patent Application Laid-Open No.SHO63-100895 executes gamma correction to the UCR/BG when color space conversion is executed to achromatic color areas, in order to obtain printed output like pure gray for the achromatic color areas. However, the conventional printing device does not use the "K"-print a lot for expressing achromatic colors, and thus it is impossible for the conventional printing device to express pure gray in the printed output.

SUMMARY OF THE INVENTION

It is therefore the primary object of the present invention to provide a color space conversion device and a color space conversion method, by which correct detection of the characteristics of the RGB data (or the CMY data) and appropriate setting of the UCR/BG table (or the LUT) are executed with respect to each smaller unit of the RGB data so as to realize correct color space conversion from the RGB data to CMYK data, and thereby RGB data in the achromatic color area, for example, can be expressed as pure gray in the CMYK data and in the printed output.

Another object of the present invention is to provide a color space conversion device and a color space conversion method, by which the color discontinuity, which occurs due to the change of the UCR/BG table (or the LUT) which is used for color space conversion, can be corrected and eliminated.

In accordance with a first aspect of the present invention, there is provided a color space conversion device for executing color space conversion from RGB data to CMYK data, comprising a first color space conversion means, a CMY position detection means, two or more conversion tables, a conversion table synthesizer means, and a second color space conversion means. The first color space conversion means converts the RGB data into C'M'Y' data. The CMY position detection means detects the position of the C'M'Y' data in the CMY color space with respect to each dot of the C'M'Y' data. The conversion tables are tables which have been optimized at particular positions in the CMY color space so as to be used for color space conversion from C'M'Y' data to CMYK data. The conversion table synthesizer means synthesizes a suitable conversion table for each dot of the C'M'Y' data from the conversion tables, based on the position of the C'M'Y' data in the CMY color space which has been detected by the CMY position detection means. The second color space conversion means converts each dot of the C'M'Y' data into CMYK data by use of the suitable conversion table for the dot which has been synthesized by the conversion table synthesizer means.

In accordance with a second aspect of the present invention, in the first aspect, the conversion tables are UCR/BG (Under Color Removal/Black Generation) tables.

In accordance with a third aspect of the present invention, in the first aspect, the CMY position detection means calculates:

$$k=\min(C', M', Y')$$

$$a=\max(C', M', Y')-\min(C', M', Y')$$

as the position of the C'M'Y' data in the CMY color space.

In accordance with a fourth aspect of the present invention, in the first aspect, the color space conversion device further comprises a continuation table means. The continuation table means outputs one or more continuation parameters based on the position of the C'M'Y' data in the CMY color space which has been detected by the CMY position detection means. The continuation parameters are used by the conversion table synthesizer means for synthesizing the suitable conversion table correcting and eliminating color discontinuity due to change of the conversion table which is used by the second color space conversion means for the color space conversion from C'M'Y' data to CMYK data.

In accordance with a fifth aspect of the present invention, in the first aspect, the first color space conversion means converts the RGB data into the C'M'Y' data by means of complementary color conversion.

In accordance with a sixth aspect of the present invention, in the first aspect, the first color space conversion means converts the RGB data into the C'M'Y' data by means of conversion using a LUT (Logical Unit Table).

In accordance with a seventh aspect of the present invention, there is provided a color space conversion device for executing color space conversion from RGB data to CMYK data, comprising an RGB position detection means, two or more conversion tables, a conversion table synthesizer means, and a color space conversion means. The RGB position detection means detects the position of the RGB data in the RGB color space with respect to each dot of the RGB data. The two or more conversion tables are tables which have been optimized at particular positions in the RGB color space so as to be used for color space conversion from RGB data to CMYK data. The conversion table synthesizer means synthesizes a suitable conversion table for each dot of the RGB data from the conversion tables, based on the position of the RGB data in the RGB color space which has been detected by the RGB position detection means. The color space conversion means converts each dot of the RGB data into CMYK data by use of the suitable conversion table for the dot which has been synthesized by the conversion table synthesizer means.

In accordance with an eighth aspect of the present invention, in the seventh aspect, the conversion tables are LUTs (Logical Unit Tables).

In accordance with a ninth aspect of the present invention, in the seventh aspect, the RGB position detection means calculates:

$$a=\max(R,G,B)-\min(R,G,B)$$

as the position of the RGB data in the RGB color space.

In accordance with a tenth aspect of the present invention, in the seventh aspect, the color space conversion device further comprises a continuation table means. The continuation table means outputs one or more continuation parameters based on the position of the RGB data in the RGB color space which has been detected by the RGB position detection means. The continuation parameters are used by the conversion table synthesizer means for synthesizing the suitable conversion table correcting and eliminating color discontinuity due to change of the conversion table which is used by the color space conversion means for the color space conversion from RGB data to CMYK data.

In accordance with an eleventh aspect of the present invention, there is provided a color space conversion method for executing color space conversion from RGB data to CMYK data, comprising a first color space conversion step, a CMY position detection step, a conversion table synthesis step, and a second color space conversion step. In the first color space conversion step, the RGB data is converted into C'M'Y' data. In the CMY position detection step, the position of the C'M'Y' data in the CMY color space is detected with respect to each dot of the C'M'Y' data. In the conversion table synthesis step, a suitable conversion table is synthesized for each dot of the C'M'Y' data from preliminarily prepared conversion tables. The conversion tables are tables which have been optimized at particular positions in the CMY color space so as to be used for color space conversion from C'M'Y' data to CMYK data. The synthesis of the suitable conversion table is executed based on the position of the C'M'Y' data in the CMY color space which has been detected in the CMY position detection step. In the second color space conversion step, each dot of the C'M'Y' data is converted into CMYK data by use of the suitable conversion table for the dot which has been synthesized in the conversion table synthesis step.

In accordance with a twelfth aspect of the present invention, in the eleventh aspect, the conversion tables are UCR/BG (Under Color Removal/Black Generation) tables.

In accordance with a thirteenth aspect of the present invention, in the CMY position detection step of the eleventh aspect, values:

$$k=\min(C', M', Y')$$

$$a=\max(C', M', Y')-\min(C', M', Y')$$

are calculated as the position of the C'M'Y' data in the CMY color space.

In accordance with a fourteenth aspect of the present invention, in the eleventh aspect, the color space conversion method further comprises a continuation parameter generation step. In the continuation parameter generation step, one or more continuation parameters are generated based on the position of the C'M'Y' data in the CMY color space which has been detected in the CMY position detection step. The continuation parameters are used in the conversion table synthesis step for synthesizing the suitable conversion table correcting and eliminating color discontinuity due to change of the conversion table which is used in the second color space conversion step for the color space conversion from C'M'Y' data to CMYK data.

In accordance with a fifteenth aspect of the present invention, in the first color space conversion step of the eleventh aspect, the RGB data is converted into the C'M'Y' data by means of complementary color conversion.

In accordance with a sixteenth aspect of the present invention, in the first color space conversion step of the eleventh aspect, the RGB data is converted into the C'M'Y' data by means of conversion using a LUT (Logical Unit Table).

In accordance with an seventeenth aspect of the present invention, there is provided a color space conversion method for executing color space conversion from RGB data to CMYK data, comprising an RGB position detection step, a conversion table synthesis step, and a color space conversion step. In the RGB position detection step, the position of the RGB data in the RGB color space is detected with respect to each dot of the RGB data. In the conversion table synthesis step, a suitable conversion table is synthesized for each dot of the RGB data from preliminarily prepared conversion tables. The conversion tables are tables which have been optimized at particular positions in the RGB color space so as to be used for color space conversion from RGB data to CMYK data. The synthesis of the suitable conversion table is executed based on the position of the RGB data in the RGB color space which has been detected in the RGB position detection step. In the color space conversion step, each dot of the RGB data is converted into CMYK data by use of the suitable conversion table for the dot which has been synthesized in the conversion table synthesis step.

In accordance with an eighteenth aspect of the present invention, in the seventeenth aspect, the conversion tables are LUTs (Logical Unit Tables).

In accordance with a nineteenth aspect of the present invention, in the RGB position detection step of the seventeenth aspect, a value:

$$a = \max(R,G,B) - \min(R,G,B)$$

is calculated as the position of the RGB data in the RGB color space.

In accordance with a twentieth aspect of the present invention, in the seventeenth aspect, the color space conversion method further comprises a continuation parameter generation step. In the continuation parameter generation step, one or more continuation parameters are generated based on the position of the RGB data in the RGB color space which has been detected in the RGB position detection step. The continuation parameters are used in the conversion table synthesis step for synthesizing the suitable conversion table correcting and eliminating color discontinuity due to change of the conversion table which is used in the color space conversion step for the color space conversion from RGB data to CMYK data.

In accordance with twenty-first through thirtieth aspects of the present invention, there are provided computer-readable record mediums storing programs for instructing a computer or a DSP (Digital Signal Processor) to execute the color space conversion methods of the eleventh through twentieth aspects of the present invention.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
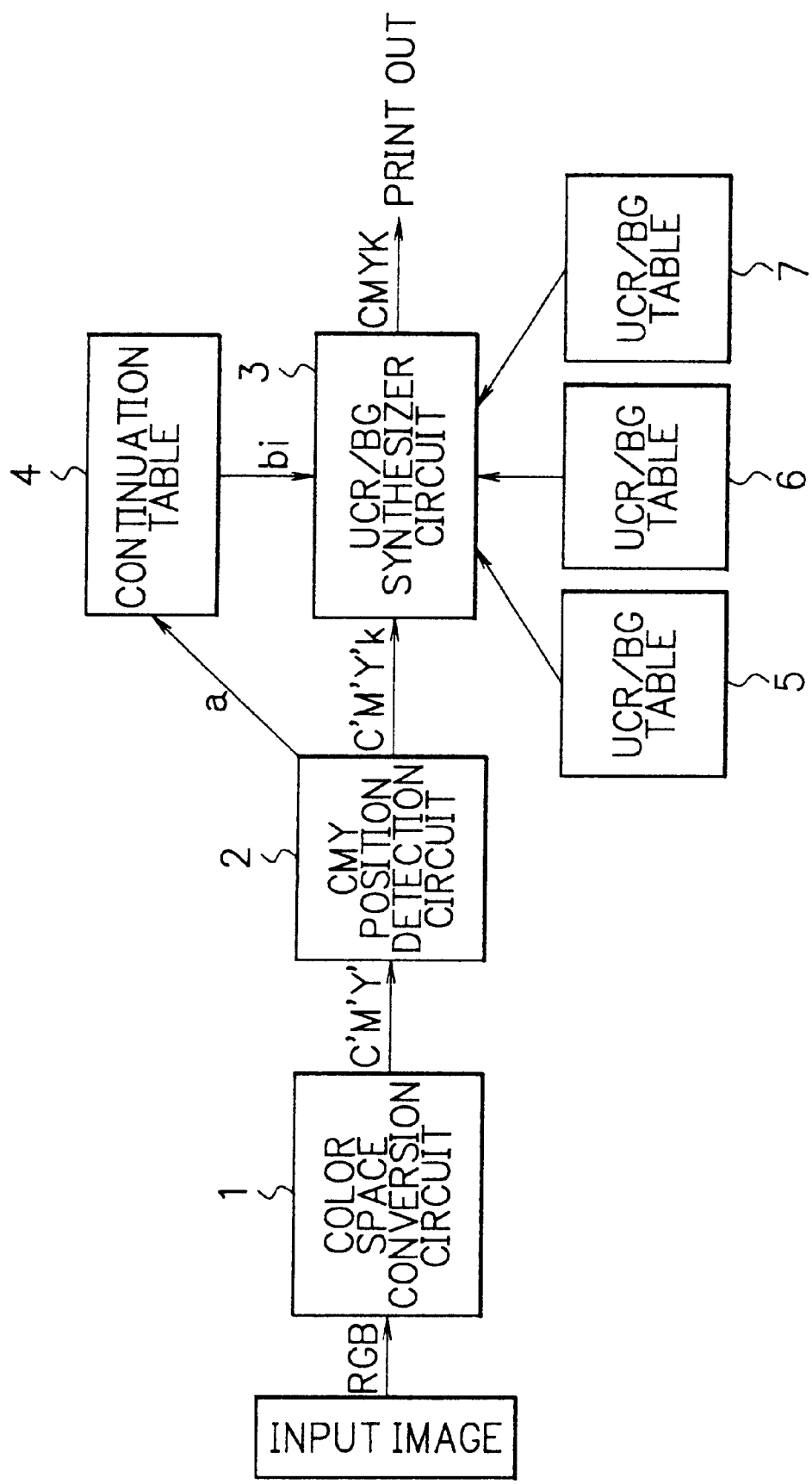
FIG. 1 is a block diagram showing a color space conversion device in accordance with a first embodiment of the present invention.

Referring now to the drawings, a description will be given in detail of preferred embodiments in accordance with the present invention.

FIG. 1 is a block diagram showing a color space conversion device in accordance with a first embodiment of the present invention. Referring to FIG. 1, the color space conversion device of the first embodiment comprises a color space conversion circuit 1, a CMY position detection circuit 2, a UCR/BG synthesizer circuit 3, a continuation table 4, and UCR/BG tables 5, 6 and 7.

The color space conversion circuit 1 executes color space conversion to RGB data which is supplied from a color image input device, and thereby outputs C'M'Y' data.

The CMY position detection circuit 2 detects the position of the C'M'Y' data (supplied from the color space conversion circuit 1) in the CMY color space, with respect to each dot of the C'M'Y' data.

The UCR/BG synthesizer circuit 3 synthesizes a suitable UCR/BG table from the UCR/BG tables 5, 6 and 7 based on the position of the C'M'Y' data detected by the CMY position detection circuit 2, and converts the C'M'Y' data into CMYK data using the synthesized UCR/BG table.

The continuation table 4 is a table for correcting and eliminating the color discontinuity which occurs due to the change of the UCR/BG(s) (5, 6, 7) which is (are) used by the UCR/BG synthesizer circuit 3 for the color space conversion from the C'M'Y' data into the CMYK data.

Each of the UCR/BG tables 5, 6 and 7 is a UCR/BG (Under Color Removal/Black Generation) table which has been optimized at a particular position in the CMY color space.

The whole components of the color space conversion device of FIG. 1 can be implemented by a DSP (Digital Signal Processor) or an IC (Integrated Circuit), for example.

Generally, the color image input device (such as a scanner, a digital camera, (a monitor), etc.) employs the RGB color space as its color space, while a color image output device such as a color printer employ the CMYK color space in many cases. Therefore, color space conversion from RGB data into CMYK data becomes necessary when color image data inputted by the color image input device is outputted by the color image output device. The color space conversion from the RGB data into the CMYK data can be executed directly using a table called LUT (Logical Unit Table). However, in the first embodiment, the color space conversion from the RGB data into the CMYK data is executed by two steps: a first color space conversion from the RGB color space into C'M'Y' data, and a second color space conversion from the C'M'Y' data into the CMYK data, in order to realize color management of a higher level. Incidentally, the following explanation will be given on the assumption that each of the RGB data (that is, each of R (Red) data, G (Green) data and B (Blue) data) is represented by 8 bits (0~255) so as to be able to express a 256-step gradation.

The color space conversion circuit 1 is a circuit for converting the RGB data supplied from the color image input device into C'M'Y' data. The color space conversion from the RGB data into the C'M'Y' data can be implemented by a simple complementary color conversion which will be mentioned below or a color space conversion using a LUT (Logical Unit Table). Either method can be employed by the color space conversion circuit 1.

The complementary color conversion is executed according to the following equations:

$C'=1-R$ $M'=1-G$ $Y'=1-B$

The inputted RGB data is converted into the C'M'Y' data by the color space conversion circuit 1, and the position of the C'M'Y' data in the CMY color space is figured out by the CMY position detection circuit 2, with respect to each dot of the C'M'Y' data. By the position detection, the CMY position detection circuit 2 calculates the following values:

$k=\min(C', M', Y')$ $a=\max(C', M', Y')-\min(C', M', Y')$

The value "k" calculated by the CMY position detection circuit 2 is supplied to the UCR/BG synthesizer circuit 3. Meanwhile, the value "a" is supplied to the continuation table 4. The UCR/BG synthesizer circuit 3 determines the values of UCR/BG depending on the values "k" and "a".

In order to convert the C'M'Y' data into the CMYK data using the UCR/BG, the following equations are used by the UCR/BG synthesizer circuit 3. Incidentally, the UCR and the BG will hereafter be expressed as UCR(k) and BG(k) although they should actually be expressed by tables, since they can be regarded as functions of the value "k".

$C=C'-UCR(k)$ $M=M'-UCR(k)$ $Y=Y'-UCR(k)$ $K=BG(k)$

The UCR/BG tables 5, 6 and 7 are used when the values UCR(k) and BG(k) are synthesized by the UCR/BG synthesizer circuit 3. Each of the UCR/BG tables 5, 6 and 7 has been optimized at a particular position in the CMY color space. The optimization of the UCR/BG tables 5, 6 and 7 will be explained below.

Figure 2:
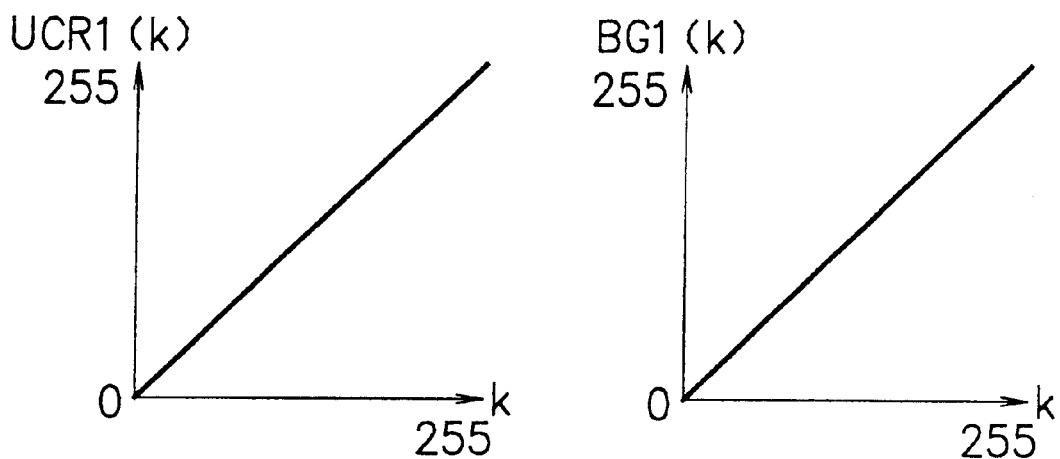
FIG. 2 is a graph showing an example of the characteristics of a first UCR/BG table (which has been optimized in the achromatic color area) which is employed in the color space conversion device of FIG. 1.

FIG. 2 is a graph showing an example of the characteristics of the UCR/BG table 5. The values of an actual UCR/BG table can not be determined simply as FIG. 2, since the values should be determined depending on the characteristics of the color image output device such as a color printer. Therefore, FIG. 2 only shows a general example. The example of FIG. 2 indicates a UCR/BG table which has been optimized in the achromatic color area. In other words, the UCR/BG table indicated by FIG. 2 has been optimized in the case where the value "a" is small. According to FIG. 2, the color space conversion from the C'M'Y' data into the CMYK data is executed using 100% of UCR (Under Color Removal) and BG (Black Generation) with respect to a given value "k", since it is desirable that the achromatic color area is expressed (printed) by the "K"-print only. The UCR and the BG determined by the UCR/BG table 5 will hereafter be expressed as UCR1(k) and BG1(k).

Figure 3:
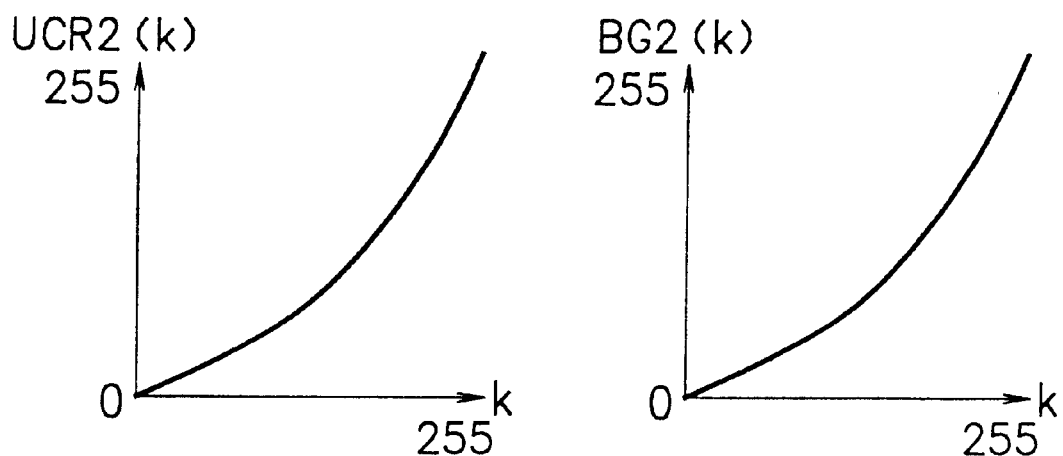
FIG. 3 is a graph showing an example of the characteristics of a second UCR/BG table (which has been optimized in the area between the achromatic color area and the high chroma area) which is employed in the color space conversion device of FIG. 1.

FIG. 3 is a graph showing an example of the characteristics of the UCR/BG table 6. The example of FIG. 3 indicates a UCR/BG table which has been optimized in between the high chroma area and the achromatic color area. The UCR and the BG determined by the UCR/BG table 6 will hereafter be expressed as UCR2(k) and BG2(k).

Figure 4:
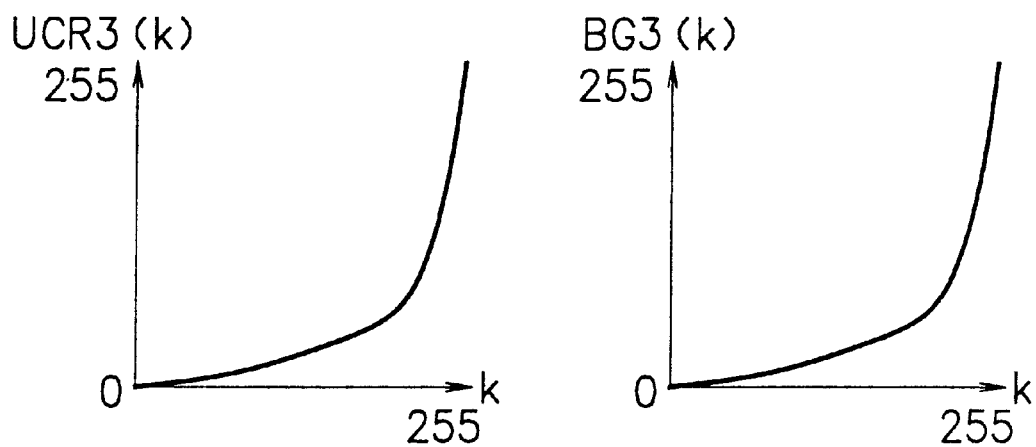
FIG. 4 is a graph showing an example of the characteristics of a third UCR/BG table (which has been optimized in the high chroma area) which is employed in the color space conversion device of FIG. 1.

FIG. 4 is a graph showing an example of the characteristics of the UCR/BG table 7. The example of FIG. 4 indicates a UCR/BG table which has been optimized in the high chroma area. In the example of FIG. 4, the removal of the CMY values by the UCR(k) and the generation of the "K"-print by the BG(k) are both restricted, and thereby deterioration of the chroma due to the use of the "K"-print is avoided. The UCR and the BG determined by the UCR/BG table 7 will hereafter be expressed as UCR3(k) and BG3(k).

The three UCR/BG tables 5, 6 and 7 are used by the UCR/BG synthesizer circuit 3 for synthesizing a UCR/BG table. The synthesis is executed according to the following algorithm:

$UCR(k)=(1-b1) \cdot UCR1(k)+(b1-b2) \cdot UCR2(k)+b2 \cdot UCR3(k)$ $BG(k)=(1-b1) \cdot BG1(k)+(b1-b2) \cdot BG2(k)+b2 \cdot BG3(k)$ where the values "b1" and "b2" are continuation parameters which are determined by the continuation table 4 based on the value "a" supplied from the CMY position detection circuit 2.

Figure 5:
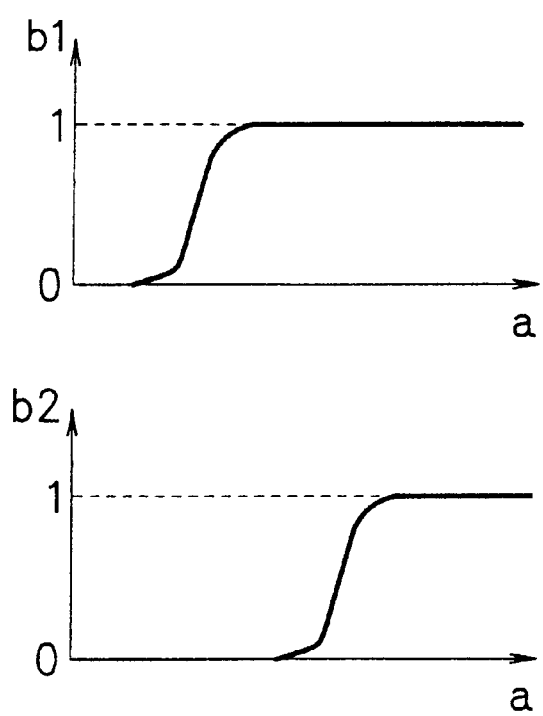
FIG. 5 is a graph showing an example of continuation parameters which are outputted by a continuation table of the color space conversion device of FIG. 1.

FIG. 5 is a graph showing an example of the continuation parameters "b1" and "b2" which are outputted by the continuation table 4. The continuation table 4 generates and outputs the continuation parameters b1 and b2 (0~1) depending on the input value "a". Referring to FIG. 5, when the value "a" is small (that is, in the case of a color near the achromatic color area), both the continuation parameters b1 and b2 become 0. When the value "a" is large (that is, in the case of a color near the high chroma area), both the continuation parameters b1 and b2 become 1. By use of such continuation parameters b1 and b2 for the above UCR(k)

and BG(k), the UCR1(k) and BG1(k) (which have been optimized in the achromatic color area) are employed as the UCR(k) and BG(k) in the case of a color near the achromatic color area, and the UCR3(k) and BG3(k) (which have been optimized in the high chroma area) are employed as the UCR(k) and BG(k) in the case of a color near the high chroma area. In the case of a color in an area between the achromatic color area and the high chroma area, the continuation parameters b1 and b2 become 1 and 0 respectively, and thus the UCR2(k) and BG2(k) (which have been optimized in the area between the achromatic color area and the high chroma area) are employed as the UCR(k) and BG(k). In the case of a color on the borders of the areas, the continuation parameters b1 and b2 take on appropriate values between 0 and 1 and thereby a UCR/BG table is synthesized from two UCR/BG tables in appropriate balance. By use of the continuation table 4, the color discontinuity, which occurs due to the change of the UCR/BG(s) (5, 6, 7) which is (are) used for the color space conversion from the C'M'Y' data into the CMYK data, is corrected and eliminated.

The UCR/BG synthesizer circuit 3 converts the C'M'Y' data into CMYK data using the UCR/BG which have been synthesized as above, and outputs the CMYK data into the color image output device such as a color printer. The color image output device outputs (prints out) the CMYK data on paper etc.

As described above, in the color space conversion device according to the first embodiment, the RGB data inputted from the color image input device is converted by the color space conversion circuit 1 into the C'M'Y' data. The position of each dot of the C'M'Y' data in the CMY color space is detected by the CMY position detection circuit 2, and thereby the values "a" and "k" are generated. The continuation table 4 determines and outputs the continuation parameters "b1" and "b2" based on the value "a" supplied from the CMY position detection circuit 2, in order to correct and eliminate the discontinuity which occurs due to the change of the UCR/BG(s) (5, 6, 7) which is (are) used by the UCR/BG synthesizer circuit 3 for the color space conversion from the C'M'Y' data into the CMYK data. The UCR/BG synthesizer circuit 3 synthesizes a UCR/BG table using the UCR/BG tables 5, 6 and 7 which have been optimized at particular positions (in the achromatic color area, in between the high chroma area and the achromatic color area, and in the high chroma area) in the CMY color space, based on the continuation parameters "b1" and "b2" supplied from the continuation table 4, and converts the C'M'Y' data into CMYK data based on the synthesized UCR/BG table and the value "k" supplied from the CMY position detection circuit 2.

Therefore, for C'M'Y' data in the achromatic color area, the UCR/BG table 5 which has been optimized in the achromatic color area is selected, thereby the replacement by the "K"-print is fully executed, and thereby printed output of pure gray can be obtained successfully. For C'M'Y' data in the high chroma area, the UCR/BG table 7 which has been optimized in the high chroma area is selected, thereby the replacement by the "K"-print is restricted, and thereby printed output with high chroma can be realized. For C'M'Y' data in the area between the achromatic color area and the high chroma area, the UCR/BG table 6 which has been optimized in the area between the achromatic color area and the high chroma area is selected, thereby the replacement by the "K"-print is moderately executed, and thereby printed output with appropriate chroma can be obtained.

The color discontinuity generally occurs in the printed output when the UCR/BG table to be used for the color space conversion is changed as above, however in this embodiment, the color discontinuity is corrected and eliminated by using the continuation table 4 and thereby executing the synthesis of the suitable UCR/BG table smoothly.

Figure 6:
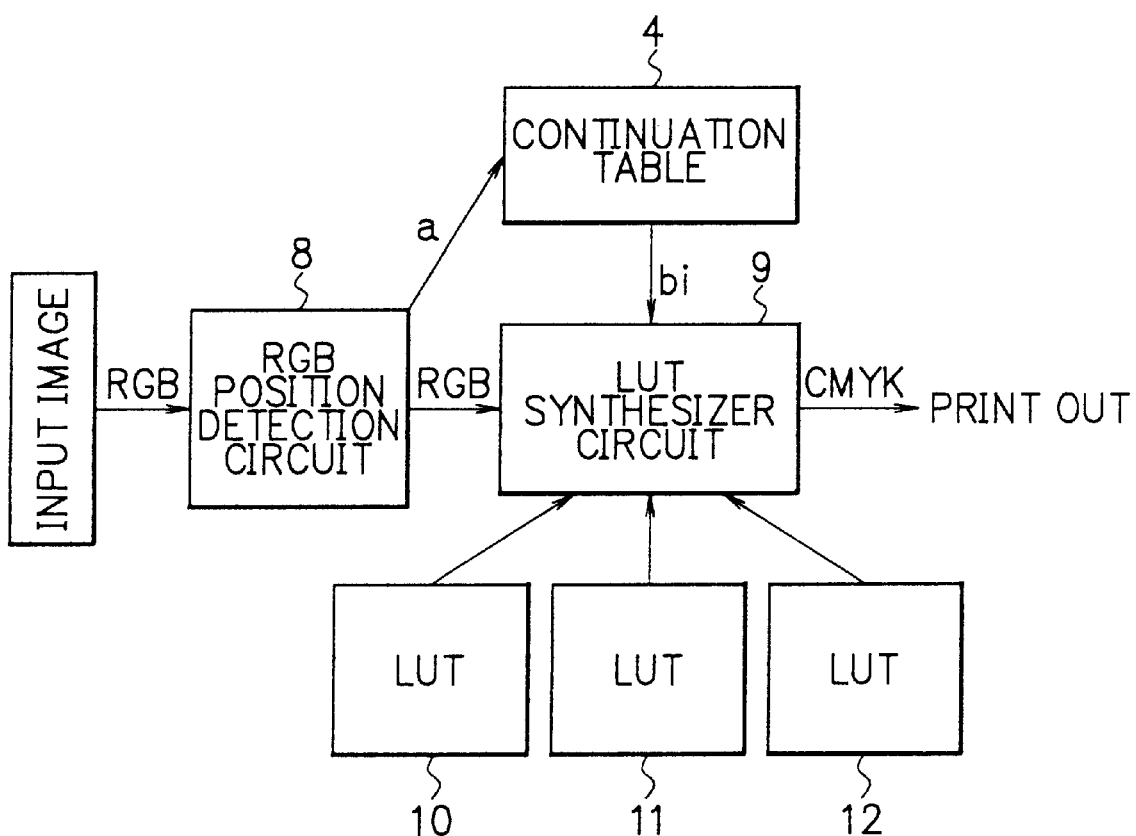
FIG. 6 is a block diagram showing a color space conversion device in accordance with a second embodiment of the present invention.

FIG. 6 is a block diagram showing a color space conversion device in accordance with a second embodiment of the present invention. Referring to FIG. 6, the color space conversion device of the second embodiment comprises a continuation table 4, an RGB position detection circuit 8, a LUT synthesizer circuit 9, and logical unit tables (LUTs) 10, 11 and 12.

The color space conversion device of the second embodiment directly converts RGB data into CMYK data by use of the LUTs (Logical Unit Tables) 10, 11 and 12 for color space conversion. The RGB data inputted by the color image output device is supplied to the RGB position detection circuit 8. The RGB position detection circuit 8 detects the position of the RGB data in the RGB color space, with respect to each dot of the RGB data. By the position detection, the RGB position detection circuit 8 calculates the following value "a":

$$a = \max(R, G, B) - \min(R, G, B)$$

The value "a" calculated by the RGB position detection circuit 8 is supplied to the continuation table 4. The continuation table 4 generates and outputs continuation parameters "b1" and "b2" based on the value "a" supplied from the RGB position detection circuit 8 similarly to the continuation table 4 of the first embodiment, in order to correct and eliminate the color discontinuity which occurs due to the change of the LUT(s) (10, 11, 12) which is (are) used by the LUT synthesizer circuit 9 for the color space conversion from RGB data into CMYK data. The LUT synthesizer circuit 9 synthesizes a suitable LUT from the LUTs 10, 11 and 12 which have been optimized at particular positions in the RGB color space. The synthesis is executed as follows:

$$LUT = (1-b1) \cdot LUT10 + (b1-b2) \cdot LUT11 + b2 \cdot LUT12$$

Thereafter, the LUT synthesizer circuit 9 directly converts the RGB data into CMYK data using the synthesized LUT.

As described above, in the color space conversion device according to the second embodiment, a suitable LUT is synthesized from the LUTs 10, 11 and 12 for each dot of the RGB data according to the position detection by the RGB position detection circuit 8 and by use of the continuation table 4, and the synthesized LUT is used for the direct color space conversion from RGB data to CMYK data, similarly to the UCR/BG optimization of the first embodiment for the color space conversion from C'M'Y' data to CMYK data. Therefore, the same effects as the those of the first embodiment can be obtained by the second embodiment.

Incidentally, while the number of UCR/BG tables (or LUTs) was 3 in the above embodiments, the number is not limited to 3 and can be changed arbitrarily.

As set forth hereinabove, in the color space conversion device and the color space conversion method according to the present invention, the position of the inputted RGB data in the RGB color space (or the position of the C'M'Y' data which has been converted from the RGB data in the CMY color space) is detected with respect to each dot of the RGB data, and thereby a suitable color space conversion table (the LUT or the UCR/BG table) is synthesized from two or more color space conversion tables (LUTs or UCR/BG tables which have been optimized at particular positions in the color space) by use of the position of the RGB (or C'M'Y' ) data in the RGB (or CMY) color space, and thereafter color space conversion from the RGB (or C'M'Y') data to CMYK data is executed by use of the synthesized suitable color space conversion table. Therefore, correct detection of the characteristics of the RGB data (or the C'M'Y' data) is executed with respect to each dot of the RGB data, and appropriate setting of the color space conversion table (the LUT or the UCR/BG table) suitable for the characteristics of the RGB data (or the C'M'Y' data) is executed for each dot, thereby correct color space conversion from the RGB data to CMYK data with high color reproduction is realized and thus high-quality image output (high-quality printed output etc.) can be obtained. For example, in the case of RGB data in the achromatic color area, the suitable color space conversion table is synthesized mainly (or exclusively) from a color space conversion table that uses the "K"-print a lot, thereby printed output of pure gray can be obtained. On the other hand, in the case of RGB data in the high chroma area, the suitable color space conversion table is synthesized mainly (or exclusively) from a color space conversion table that restricts the use of the "K"-print, thereby printed output of natural high chroma can be obtained. On the whole, the contrast of the output image is improved.

Further, a continuation table is used for the synthesis of the suitable color space conversion table. Therefore, color discontinuity, tone jump, etc., which occur due to the change of the color space conversion table (the LUT or the UCR/BG table) which is used for color space conversion, is corrected and eliminated, thereby natural image output (printed output etc.) can be obtained, and thus the quality of the image output can be maintained in a high level.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color space conversion device for executing color space conversion from RGB data to CMYK data, comprising:

a first color space conversion means for converting the RGB data into C'M'Y' data;

a CMY position detection means for detecting the position of the C'M'Y' data in the CMY color space with respect to each dot of the C'M'Y' data;

two or more conversion tables which have been optimized at particular positions in the CMY color space so as to be used for color space conversion from C'M'Y' data to CMYK data;

a conversion table synthesizer means for synthesizing a suitable conversion table for each dot of the C'M'Y' data from the conversion tables, based on the position of the C'M'Y' data in the CMY color space which has been detected by the CMY position detection means; and a second color space conversion means for converting each dot of the C'M'Y' data into CMYK data by use of the suitable conversion table for the dot which has been synthesized by the conversion table synthesizer means.

2. A color space conversion device as claimed in claim 1, wherein the conversion tables are UCR/BG (Under Color Removal/Black Generation) tables.

3. A color space conversion device as claimed in claim 1, wherein the CMY position detection means calculates:

$$k=\min(C', M', Y')$$

$$a=\max(C', M', Y')-\min(C', M', Y')$$

as the position of the C'M'Y' data in the CMY color space.

4. A color space conversion device as claimed in claim 1, further comprising a continuation table means for outputting one or more continuation parameters based on the position of the C'M'Y' data in the CMY color space which has been detected by the CMY position detection means, so as to be used by the conversion table synthesizer means for synthesizing the suitable conversion table correcting and eliminating color discontinuity due to change of the conversion table which is used by the second color space conversion means for the color space conversion from C'M'Y' data to CMYK data.

5. A color space conversion device as claimed in claim 1, wherein the first color space conversion means converts the RGB data into the C'M'Y' data by means of complementary color conversion.

6. A color space conversion device as claimed in claim 1, wherein the first color space conversion means converts the RGB data into the C'M'Y' data by means of conversion using a LUT (Logical Unit Table).

7. A color space conversion device for executing color space conversion from RGB data to CMYK data, comprising:

an RGB position detection means for detecting the position of the RGB data in the RGB color space with respect to each dot of the RGB data;

wherein the RGB position detection means calculates:

$$a=\max(R, G, B)-\min(R, G, B)$$

as the position of the RGB data in the RGB color space;

two or more conversion tables which have been optimized at particular positions in the RGB color space so as to be used for color space conversion from RGB data to CMYK data;

a conversion table synthesizer means for synthesizing a suitable conversion table for each dot of RGB data from the conversion tables, based on the position of the RGB data in the RGB color space which has been detected by the RGB position detection means; and a color space conversion means for converting each dot of the RGB data into CMYK data by use of the suitable conversion table for the dot which has been synthesized by the conversion table synthesizer means.

8. A color space conversion device for executing color space conversion from RGB data to CMYK data, comprising:

an RGB position detection means for detecting the position of the RGB data in the RGB color space with respect to each dot of the RGB data;

two or more conversion tables which have been optimized at particular positions in the RGB color space so as to be used for color space conversion from RGB data to CMYK data;

a conversion table synthesizer means for synthesizing a suitable conversion table for each dot of RGB data from the conversion tables, based on the position of the RGB data in the RGB color space which has been detected by the RGB position detection means; and a color space conversion means for converting each dot of the RGB data into CMYK data by use of the suitable conversion table for the dot which has been synthesized by the conversion table synthesizer means; and a continuation table means for outputting one or more continuation parameters based on the position of the RGB data in the RGB color space which has been detected by the RGB position detection means, so as to be used by the conversion table synthesizer means for synthesizing the suitable conversion table correcting and eliminating color discontinuity due to change of the conversion table which is used by the color space conversion means for the color space conversion from RGB data to CMYK data.

9. A color space conversion method for executing color space conversion RGB data to CMYK data, comprising the steps of:

a first color space conversion step in which the RGB data is converted into C'M'Y' data;

a CMY position detection step in which the position of the C'M'Y' data in the CMY color space is detected with respect to each dot of the C'M'Y' data;

a conversion table synthesis step in which a suitable conversion table is synthesized for each dot of the C'M'Y' data from preliminarily prepared conversion tables, which have been optimized at particular positions in the CMY color space so as to be used for color space conversion from C'M'Y' data to CMYK data, based on the position of the C'M'Y' data in the CMY color space which has been detected in the CMY position detection step; and a second color space conversion step in which each dot of the C'M'Y' data is converted into CMYK data by use of the suitable conversion table for the dot which has been synthesized in the conversion table synthesis step.

10. A color space conversion method as claimed in claim 9, wherein the conversion tables are UCR/BG (Under Color Removal/Black Generation) tables.

11. A color space conversion method as claimed in claim 9, wherein in the CMY position detection step, values:

$k = \min(C', M', Y')$ $a = \max(C', M', Y') - \min(C', M', Y')$ are calculated as the position of the C'M'Y' data in the CMY color space.

12. A color space conversion method as claimed in claim 9, further comprising a continuation parameter generation step in which one or more continuation parameters are generated based on the position of the C'M'Y' data in the CMY color space which has been detected in the CMY position detection step, so as to be used in the conversion table synthesis step for synthesizing the suitable conversion table correcting and eliminating color discontinuity due to change of the conversion table which is used in the second color space conversion step for the color space conversion from C'M'Y' data to CMYK data.

13. A color space conversion method as claimed in claim 9; wherein in the first color space conversion step, the RGB data is converted into the C'M'Y' data by means of complementary color conversion.

14. A color space conversion method as claimed in claim 9, wherein in the first color space conversion step, the RGB data is converted into the C'M'Y' data by means of conversion using a LUT (Logical Unit Table).

15. A color space conversion method for executing color space conversion from RGB data to CMYK data, comprising the steps of:

an RGB position detection step in which the position of the RGB data in the RGB color space is detected with respect to each dot of the RGB data;

wherein in the RGB position detection step, a value:

$a = \max(R, G, B) - \min(R, G, B)$ is calculated as the position of the RGB data in the RGB color space;

a conversion table synthesis step in which a suitable conversion table is synthesized for each dot of the RGB data from preliminary prepared conversion tables, which have been optimized at particular positions in the RGB color space so as to be used for color space conversion from RGB data to CMYK data, based on the position of the RGB data in the RGB color space which has been detected in the RGB position detection step; and a color space conversion step in which each dot of the RGB data is converted into CMYK data by use of the suitable conversion table for the dot which has been synthesized in the conversion table synthesis step.

16. A color space conversion method for executing color space conversion from RGB data to CMYK data, comprising the steps of:

an RGB position detection step in which the position of the RGB data in the RGB color space is detected with respect to each dot of the RGB data;

a conversion table synthesis step in which a suitable conversion table is synthesized for each dot of the RGB data from preliminary prepared conversion tables, which have been optimized at particular positions in the RGB color space so as to be used for color space conversion from RGB data to CMYK data, based on the position of the RGB data in the RGB color space which has been detected in the RGB position detection step; and a color space conversion step in which each dot of the RGB data is converted into CMYK data by use of the suitable conversion table for the dot which has been synthesized in the conversion table synthesis step; and a continuation parameter generation step in which one or more continuation parameters are generated based on the position of the RGB data in the RGB color space which has been detected in the RGB position detection step, so as to be used in the conversion table synthesis step for synthesizing the suitable conversion table correcting and eliminating color discontinuity due to change of the conversion table which is used in the color space conversion step for the color space conversion from RGB data to CMYK data.

17. A computer-readable record medium storing a program for instructing a computer or a DSP (Digital Signal Processor) to execute processes for color space conversion from RGB data to CMYK data, wherein the processes include:

a first color space conversion step in which the RGB data is converted into C'M'Y' data;

a CMY position detection step in which the position of the C'M'Y' data in the CMY color space is detected with respect to each dot of the C'M'Y' data;

a conversion table synthesis step in which a suitable conversion table is synthesized for each dot of the C'M'Y' data from preliminarily prepared conversion tables, which have been optimized at particular positions in the CMY color space so as to be used for color space conversion from C'M'Y' data to CMYK data, based on the position of the C'M'Y' data in the CMY color space which has been detected in the CMY position detection step; and a second color space conversion step in which each dot of the C'M'Y' data is converted into CMYK data by use of the suitable conversion table for the dot which has been synthesized in the conversion table synthesis step.

18. A computer-readable record medium as claimed in claim 17, wherein the conversion tables are UCR/BG (Under Color Removal/Black Generation) tables.

19. A computer-readable record medium as claimed in claim 17, wherein in the CMY position detection step, values:

$$k=\min(C', M', Y')$$

$$a=\max(C', M', Y')-\min(C', M', Y')$$

are calculated as the position of the C'M'Y' data in the CMY color space.

20. A computer-readable record medium as claimed in claim 17, wherein the processes further include a continuation parameter generation step in which one or more continuation parameters are generated based on the position of the C'M'Y' data in the CMY color space which has been detected in the CMY position detection step, so as to be used in the conversion table synthesis step for synthesizing the suitable conversion table correcting and eliminating color discontinuity due to change of the conversion table which is used in the second color space conversion step for the color space conversion from C'M'Y' data to CMYK data.

21. A computer-readable record medium as claimed in claim 17, wherein in the first color space conversion step, the RGB data is converted into the C'M'Y' data by means of complementary color conversion.

22. A computer-readable record medium as claimed in claim 17, wherein in the first color space conversion step, the RGB data is converted into the C'M'Y' data by means of conversion using a LUT (Logical Unit Table).

23. A computer-readable record medium storing a program for instructing a computer or a DSP (Digital Signal Processor) to execute processes for color space conversion from RGB data to CMYK data, wherein the processes include:

an RGB position detection step in which the position of the RGB data in the RGB color space is detected with respect to each dot of the RGB data;

wherein in the RGB position data detection step, a value:

$$a=\max(R, G, B)-\min(R, G, B)$$

is calculated as the position of the RGB data in the RGB color space;

a conversion table synthesis step in which a suitable conversion table is synthesized for each dot of the RGB data from preliminarily prepared conversion tables, which have been optimized at particular positions in the RGB color space so as to be used for color space conversions from RGB data to CMYK data, based on the position of the RGB data in the RGB color space which has been detected in the RGB position detection step; and a color space conversion step in which each dot of the RGB data is converted into CMYK data by use of the suitable conversion table for the dot which has been synthesized in the conversion table synthesis step.

24. A computer-readable record medium storing a program for instructing a computer or a DSP (Digital Signal Processor) to execute processes for color space conversion from RGB data to CMYK data, wherein the processes include:

an RGB position detection step in which the position of the RGB data in the RGB color space is detected with respect to each dot of the RGB data;

a conversion table synthesis step in which a suitable conversion table is synthesized for each dot of the RGB data from preliminarily prepared conversion tables, which have been optimized at particular positions in the RGB color space so as to be used for color space conversions from RGB data to CMYK data, based on the position of the RGB data in the RGB color space which has been detected in the RGB position detection step;

a color space conversion step in which each dot of the RGB data is converted into CMYK data by use of the suitable conversion table for the dot which has been synthesized in the conversion table synthesis step; and wherein the processes further include a continuation parameter generation step in which one or more continuation parameters are generated based on the position of the RGB data in the RGB color space which has been detected in the RGB position detection step, so as to be used in the conversion table synthesis step for synthesizing the suitable conversion table correcting and eliminating color discontinuity due to change of the conversion table which is used in the color space conversion step for the color space conversion from RGB data to CMYK data.

* * * * *